United States Patent
Li et al.

(10) Patent No.: US 9,688,811 B2
(45) Date of Patent: Jun. 27, 2017

(54) METHOD FOR SYNTHESIZING POLY(BUTYLENE SUCCINATE) CATALYZED BY BIOGENIC GUANIDININE

(71) Applicant: Nanjing University, Nanjing (CN)

(72) Inventors: Hong Li, Nanjing (CN); Quanxing Zhang, Nanjing (CN); Yiting Song, Nanjing (CN); Xiangqian Sun, Nanjing (CN); Wei Huang, Nanjing (CN); Aimin Li, Nanjing (CN)

(73) Assignee: NANJING UNIVERSITY, Nanjing (CN)

(*) Notice: Subject to any disclaimer, the term of this patent is extended or adjusted under 35 U.S.C. 154(b) by 0 days.

(21) Appl. No.: 15/263,307

(22) Filed: Sep. 12, 2016

(65) Prior Publication Data

US 2016/0376402 A1    Dec. 29, 2016

Related U.S. Application Data

(63) Continuation-in-part of application No. PCT/CN2016/076956, filed on Mar. 22, 2016.

(30) Foreign Application Priority Data

Apr. 13, 2015 (CN) .......................... 2015 1 0173741

(51) Int. Cl.
| | |
|---|---|
| C08G 64/00 | (2006.01) |
| C08G 63/87 | (2006.01) |
| C08G 63/16 | (2006.01) |
| C08G 63/83 | (2006.01) |
| C08G 63/85 | (2006.01) |
| C08G 63/02 | (2006.01) |

(52) U.S. Cl.
CPC ............. *C08G 63/87* (2013.01); *C08G 63/16* (2013.01); *C08G 63/83* (2013.01); *C08G 63/85* (2013.01)

(58) Field of Classification Search
CPC ....................................... C08G 63/83
USPC ......................... 528/271, 272, 279
See application file for complete search history.

(56) References Cited

U.S. PATENT DOCUMENTS

2014/0235815 A1* 8/2014 Burgard .................. C07C 55/10
528/271

FOREIGN PATENT DOCUMENTS

| CN | 104031253 A | 9/2014 |
| CN | 104119518 A | 10/2014 |
| CN | 104725615 A | 6/2015 |

* cited by examiner

*Primary Examiner* — Terressa Boykin
(74) *Attorney, Agent, or Firm* — Matthias Scholl, PC; Matthias Scholl

(57) ABSTRACT

A method for synthesizing poly(butylene succinate) (PBS) having a weight average molecular weight ($M_w$) equal to or larger than $1.4 \times 10^5$. The method employs biogenic guanidine (BG) as the main catalyst and includes: a) adding succinic acid (SA), 1.4-butanediol (BDO), and biogenic guanidine to a reactor, heating the reactor to a temperature of between 180 and 200° C. and conducting the esterification between succinic acid and 1.4-butanediol for 2 to 3 hours under atmospheric pressure until all of the water is distilled or boiled off; and b) adding a first cocatalyst, a second cocatalyst, and a third cocatalyst to the reactor, adjusting the absolute pressure in the reactor to be between 0.5 and 3 torr, and polycondensing the mixture in the reactor at the temperature between 210 and 230° C. over 20 to 30 hours.

4 Claims, No Drawings

METHOD FOR SYNTHESIZING POLY(BUTYLENE SUCCINATE) CATALYZED BY BIOGENIC GUANIDININE

CROSS-REFERENCE TO RELATED APPLICATIONS

This application is a continuation-in-part of International Patent Application No. PCT/CN2016/076956 with an international filing date of Mar. 22, 2016, designating the United States, now pending, and further claims priority benefits to Chinese Patent Application No. 201510173741.4 filed Apr. 13, 2015. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND OF THE INVENTION

Field of the Invention

The invention relates to a method for synthesizing biodegradable poly(butylene succinate).

Description of the Related Art

Conventionally, poly(butylene succinate) (PBS) is prepared using heavy metal compounds as catalysts, such as stannous octoate, stannous chloride, dibutyltin oxide and alkoxyl antimony. However, these metal catalysts are toxic and non-environmentally friendly. Also, the resulting PBS synthesized via direct polycondensation has a weight average molecular weight ($M_w$) of less than $1.4 \times 10^5$, which limits the applications thereof. To synthesize PBS products with a weight average molecular weight equal to or larger than $1.4 \times 10^5$, a chain extender such as isocyanate is employed. However, the chain extender is also toxic.

SUMMARY OF THE INVENTION

In view of the above-described problems, the main objective of the invention to provide a method for synthesizing poly(butylene succinate) (PBS) using non-toxic biogenic guanidine as a main catalyst. The weight average molecular weight ($M_w$) of the PBS product is equal to or larger than $1.4 \times 10^5$.

To achieve the above objective, in accordance with one embodiment of the invention, there is provided a method for synthesizing poly(butylene succinate) (PBS), PBS having a weight average molecular weight ($M_w$) equal to or larger than $1.4 \times 10^5$, the method using biogenic guanidine (BG) as a main catalyst, and the method comprising:

a) adding succinic acid (SA), 1.4-butanediol (BDO), and biogenic guanidine (BG) to a reactor, biogenic guanidine being a main catalyst; heating the reactor to a temperature of between 180 and 200° C. and conducting an esterification between succinic acid and 1.4-butanediol for 2 to 3 hours under atmospheric pressure until all of water is distilled or boiled off; and b) adding a first cocatalyst, a second cocatalyst, and a third cocatalyst to the reactor, adjusting an absolute pressure in the reactor to be between 0.5 and 3 torr, and polycondensing a mixture in the reactor at a temperature between 210 and 230° C. over 20 to 30 hours.

In a class of this embodiment, a catalyst system comprises: the main catalyst (BG), which is guanine (GN) or creatinine (CR); the first cocatalyst ($CoCAT_1$), which is tetrabutoxytitanium ($TiOBu_4$) or tetrabutoxyzirconium (TBOZ); the second cocatalyst ($CoCAT_2$): titanium dioxide (TDO); and the third cocatalyst ($CoCAT_3$), which is zinc oxide (ZO), zinc chloride (ZC), or zinc acetate (ZA).

In a class of this embodiment, a molar ratio of SA to BDO is 1:1-1.5.

In a class of this embodiment, BG accounts for between 0.01 mol. ‰ and 0.05 mol. ‰ of SA.

In a class of this embodiment, a molar ratio of BG to the first cocatalyst is between 1.0:1.0 and 1.0:2.0.

In a class of this embodiment, a molar ratio of BG to the second cocatalyst is between 1.0:1.0 and 1.0:2.0.

In a class of this embodiment, a molar ratio of BG to the third cocatalyst is between 1.0:2.0 and 1.0:5.0.

The weight average molecular weight ($M_w$) of the PBS product is variable between $1.4 \times 10^5$ and $1.7 \times 10^5$ according to actual needs and catalyst composition.

Compared with existing technologies, advantages of the method for synthesizing PBS according to embodiments of the invention are given below:

1. The quaternary catalyst system is employed, so that the catalytic efficiency is high and the catalyst consumption is low.
2. Side reactions are largely reduced in the method.
3. The molecular weight of the polymer can be controlled according to actual needs.

DETAILED DESCRIPTION OF THE EMBODIMENTS

For further illustrating the invention, experiments detailing a method for synthesizing poly(butylene succinate) (PBS) using non-toxic biogenic guanidine as a catalyst are described below. It should be noted that the following examples are intended to describe and not to limit the invention.

EXAMPLE 1

Succinic acid (SA, 59.05 g, 0.50 mol), 1.4-butanediol (BDO, 58.58 g, 0.65 mol) and creatinine (CR, 2.83 mg, 0.025 mmol) were added to a reaction still, and under argon atmosphere, the reaction mixture was esterified under atmospheric pressure at 180° C. for three hours. Then, tetrabutoxyzirconium (TBOZ, 9.59 mg, 0.025 mmol), titanium dioxide (TDO, 2.00 mg, 0.025 mmol), and zinc oxide (ZO, 10.17 mg, 0.125 mmol) were added, and the reaction still was heated to 210° C. for a polycondensation under a reduced pressure of 1.5 torr for 30 hours. Based on a gel permeation chromatography (GPC) method, the weight average molecular weight ($M_w$) of the polymer was $1.55 \times 10^5$, and a polydispersity index PDI was 1.55.

EXAMPLE 2

Succinic acid (SA, 59.05 g, 0.50 mol), 1.4-butanediol (BDO, 67.59 g, 0.75 mol) and guanine (GN, 1.51 mg, 0.01 mmol) were added to a reaction still, and under argon atmosphere, the reaction mixture was esterified under atmospheric pressure at 200° C. for two hours. Then tetrabutoxytitanium ($TiOBu_4$, 6.81 mg, 0.02 mmol), titanium dioxide (TDO, 0.96 mg, 0.012 mmol), and zinc oxide (ZO, 2.44 mg, 0.03 mmol) were added, and the reaction still was heated to 230° C. for a polycondensation under a reduced pressure of 1.0 torr over 27 hours. Based on a gel permeation chromatography (GPC) method, the weight average molecular weight ($M_w$) of the polymer was $1.70\times10^5$, and a polydispersity index PDI was 1.67.

EXAMPLE 3

Succinic acid (SA, 59.05 g, 0.50 mol), 1.4-butanediol (BDO, 49.57 g, 0.55 mol) and guanine (GN, 0.755 mg, 0.005 mmol) were added to a reaction still, and under argon atmosphere, the reaction mixture was esterified under atmospheric pressure at 200° C. for two hours. Then tetrabutoxytitanium (TiOBu$_4$, 1.702 mg, 0.005 mmol), titanium dioxide (TDO, 0.80 mg, 0.01 mmol), and zinc chloride (ZC, 2.73 mg, 0.02 mmol) were added, and the reaction still was heated to 230° C. for a polycondensation under a reduced pressure of 2.5 torr over 20 hours. Based on a gel permeation chromatography (GPC) method, the weight average molecular weight ($M_w$) of the polymer was $1.61\times10^5$, and a polydispersity index PDI was 1.69.

EXAMPLE 4

Succinic acid (SA, 47.24 g, 0.40 mol), 1.4-butanediol (BDO, 54.07 g, 0.60 mol) and creatinine (CR, 2.26 mg, 0.02 mmol) were added to a reaction still, and under argon atmosphere, the reaction mixture was esterified under atmospheric pressure at 190° C. for three hours. Then tetrabutoxyzirconium (TBOZ, 11.51 mg, 0.03 mmol), titanium dioxide (TiO$_2$, 2.0 mg, 0.03 mmol), and zinc acetate (ZA, 9.17 mg, 0.05 mmol) were added, and the reaction still was heated to 230° C. for a polycondensation under a reduced pressure of 0.5 torr over 24 hours. Based on a gel permeation chromatography (GPC) method, the weight average molecular weight ($M_w$) of the polymer was $1.69\times10^5$, and a polydispersity index PDI was 1.86.

EXAMPLE 5

Succinic acid (SA, 47.24 g, 0.60 mol), 1.4-butanediol (BDO, 54.07 g, 0.72 mol) and guanine (GN, 2.27 mg, 0.015 mmol) were added to a reaction still, and under argon atmosphere, the reaction mixture was esterified under atmospheric pressure at 180° C. for three hours. Then tetrabutoxytitanium (TiOBu$_4$, 11.51 mg, 0.03 mmol), titanium dioxide (TDO, 2.16 mg, 0.027 mmol), and zinc chloride (ZC, 4.09 mg, 0.03 mmol) were added, and the reaction still was heated to 220° C. for a polycondensation under a reduced pressure of 3.0 torr over 23 hours. Based on a gel permeation chromatography (GPC) method, the weight average molecular weight ($M_w$) of the polymer was $1.41\times10^5$, and a polydispersity index PDI was 1.91.

EXAMPLE 6

Succinic acid (SA, 59.05 g, 0.50 mol), 1.4-butanediol (BDO, 45.06 g, 0.50 mol) and creatinine (CR, 2.26 mg, 0.02 mmol) were added to a reaction still, and under argon atmosphere, the reaction mixture was esterified under atmospheric pressure at 190° C. for three hours. Then tetrabutoxyzirconium (TBOZ, 11.51 mg, 0.03 mmol), titanium dioxide (TiO$_2$, 2.56 mg, 0.032 mmol), and zinc acetate (ZA, 16.51 mg, 0.09 mmol) were added, and the reaction still was heated to 220° C. for a polycondensation under a reduced pressure of 2.5 torr over 25 hours. Based on a gel permeation chromatography (GPC) method, the weight average molecular weight ($M_w$) of the polymer was $1.58\times10^5$, and a polydispersity index PDI was 1.74.

Unless otherwise indicated, the numerical ranges involved in the invention include the end values. While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method for synthesizing poly(butylene succinate) (PBS) having a weight average molecular weight ($M_w$) equal to or larger than $1.4\times10^5$, the method comprising:
   a) adding succinic acid (SA), 1,4-butanediol (BDO), and a main catalyst to a reactor, wherein the main catalyst is guanine (GN) or creatinine (CR); heating the reactor to a temperature of between 180 and 200° C. and conducting an esterification between the succinic acid and the 1,4-butanediol for 2 to 3 hours under atmospheric pressure until all of water is distilled or boiled off; and
   b) adding a first cocatalyst, a second cocatalyst, and a third cocatalyst to the reactor, adjusting an absolute pressure in the reactor to be between 0.5 and 3 torr, and polycondensing a mixture in the reactor at a temperature between 210 and 230° C. over 20 to 30 hours.

2. The method of claim 1, wherein
   the first cocatalyst is tetrabutoxytitanium (TiOBu$_4$) or tetrabutoxyzirconium (TBOZ);
   the second cocatalyst is titanium dioxide (TDO); and
   the third cocatalyst is zinc oxide (ZO), zinc chloride (ZC), or zinc acetate (ZA).

3. The method of claim 1, wherein
   a molar ratio of SA to BDO is between 1:1 and 1:1.5;
   the main catalyst accounts for between 0.01 mol. ‰ and 0.05 mol. ‰ of SA;
   a molar ratio of the main catalyst to the first cocatalyst is between 1.0:1.0 and 1.0:2.0;
   a molar ratio of the main catalyst to the second cocatalyst is between 1.0:1.0 and 1.0:2.0; and
   a molar ratio of the main catalyst to the third cocatalyst is between 1.0:2.0 and 1.0:5.0.

4. The method of claim 2, wherein
   a molar ratio of SA to BDO is between 1:1 and 1:1.5;
   the main catalyst accounts for between 0.01 mol. ‰ and 0.05 mol. ‰ of SA;
   a molar ratio of the main catalyst to the first cocatalyst is between 1.0:1.0 and 1.0:2.0;
   a molar ratio of the main catalyst to the second cocatalyst is between 1.0:1.0 and 1.0:2.0; and
   a molar ratio of the main catalyst to the third cocatalyst is between 1.0:2.0 and 1.0:5.0.

* * * * *